United States Patent

Pontoppidan

(10) Patent No.: US 6,691,672 B2
(45) Date of Patent: Feb. 17, 2004

(54) DIRECT-INJECTION INTERNAL COMBUSTION ENGINE WITH CONTROLLED VALVES

(75) Inventor: Michaël Pontoppidan, Colombes (FR)

(73) Assignee: Magneti Marelli France, Nanterre (FR)

( * ) Notice: Subject to any disclaimer, the term of this patent is extended or adjusted under 35 U.S.C. 154(b) by 0 days.

(21) Appl. No.: 10/148,483

(22) PCT Filed: Jan. 8, 2001

(86) PCT No.: PCT/FR01/00042
§ 371 (c)(1),
(2), (4) Date: May 30, 2002

(87) PCT Pub. No.: WO01/51790
PCT Pub. Date: Jul. 19, 2001

(65) Prior Publication Data
US 2002/0179042 A1 Dec. 5, 2002

(30) Foreign Application Priority Data
Jan. 10, 2000 (FR) .............................. 00 00232

(51) Int. Cl.⁷ ................................... F02B 3/00
(52) U.S. Cl. .................. 123/302; 123/308; 123/148.52; 123/406.58
(58) Field of Search ................. 123/302, 308, 123/406.58, 432, 305, 184.52, 184.55, 41.85

(56) References Cited

U.S. PATENT DOCUMENTS

| | | | |
|---|---|---|---|
| 5,477,823 A | * 12/1995 | Uchida | 123/308 |
| 5,852,994 A | * 12/1998 | Tsuzuku et al. | 123/308 |
| 5,983,843 A | * 11/1999 | Suzuki et al. | 123/41.82 R |
| 6,053,145 A | * 4/2000 | Suzuki et al. | 123/298 |
| 6,055,948 A | 5/2000 | Shiraishi et al. | 123/90.15 |
| 6,090,356 A1 | 5/2002 | Hertzberg et al. | 123/295 |
| 6,510,837 B1 | * 1/2003 | Aoyama | 139/383 A |

FOREIGN PATENT DOCUMENTS

| | | |
|---|---|---|
| JP | 10 008967 | 1/1998 |
| JP | 10 317979 | 12/1998 |
| JP | 11 351012 | 12/1999 |
| WO | 99/06677 | 2/1999 |
| WO | 00/09872 | 2/2000 |

* cited by examiner

*Primary Examiner*—Willis R. Wolfe
*Assistant Examiner*—Johnny H. Hoang
(74) *Attorney, Agent, or Firm*—Sturm & Fix LLP

(57) ABSTRACT

The invention concerns a direct injection internal combustion engine comprising a camshaft and at least two cylinders (1), having in each cylinder a mobile piston (2) associated with at least to intake valves (4, 5), each located in an induction pipes (8, 9), and at least an exhaust valve (6, 7). The displacement of said valves is independent of the rotation of the camshaft and is controlled by a computer (15). The induction pipes (8, 9) are designed to produce an air velocity field inside the cylinder (1) parallel to said cylinder axis. The computer (15) controls, cylinder by cylinder, the opening and closing times of said at lent two intake valves (4, 5) to adapt the shape of the air velocity field inside the cylinder (1) to the engine power.

14 Claims, 2 Drawing Sheets

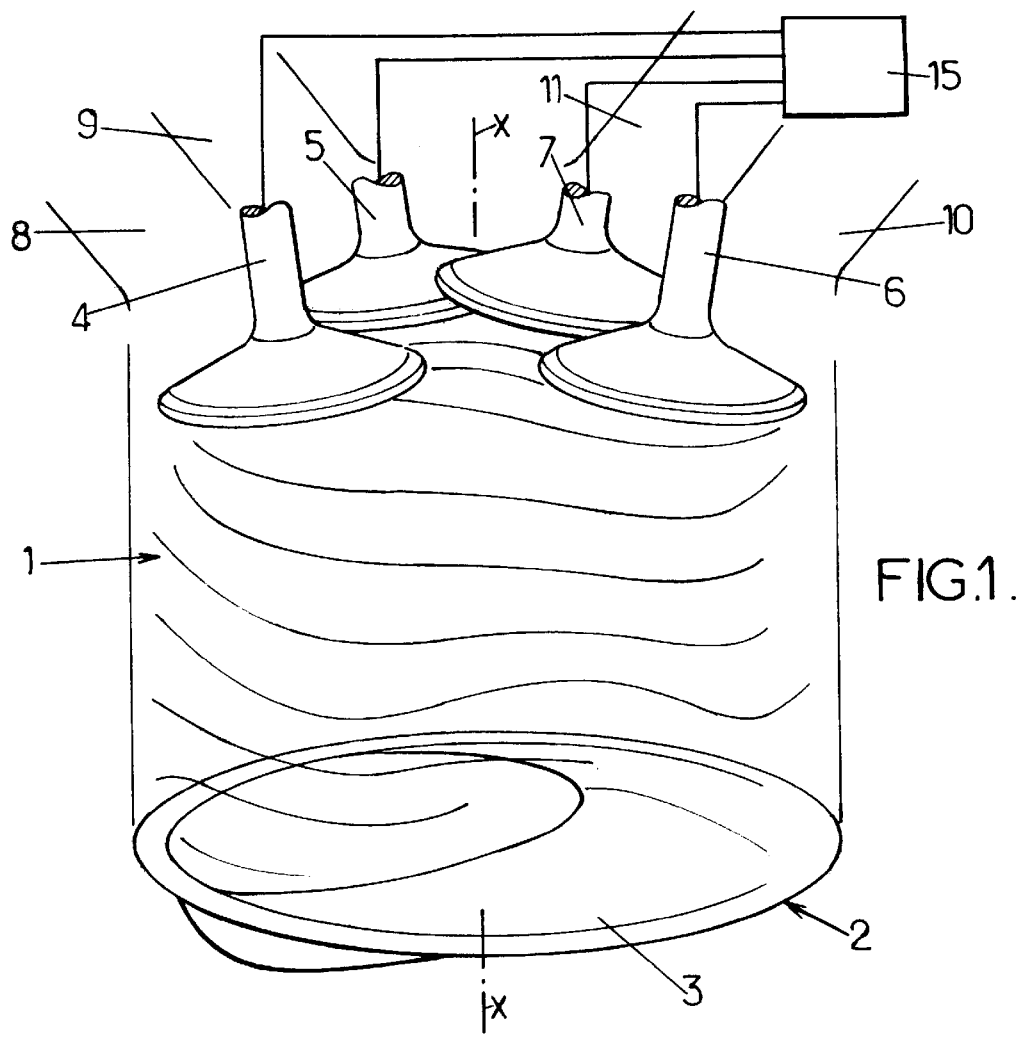
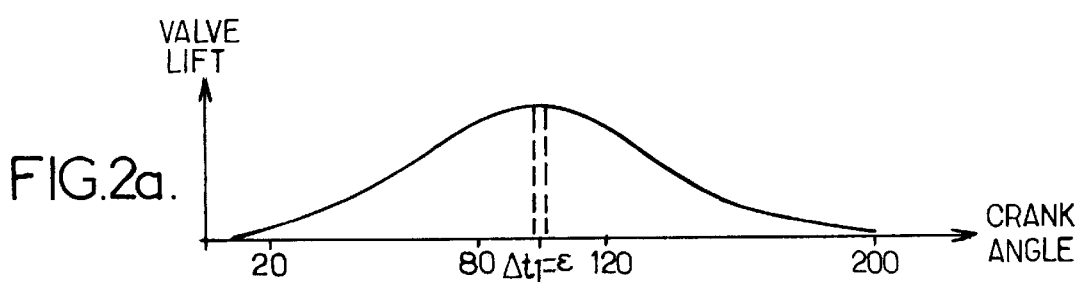
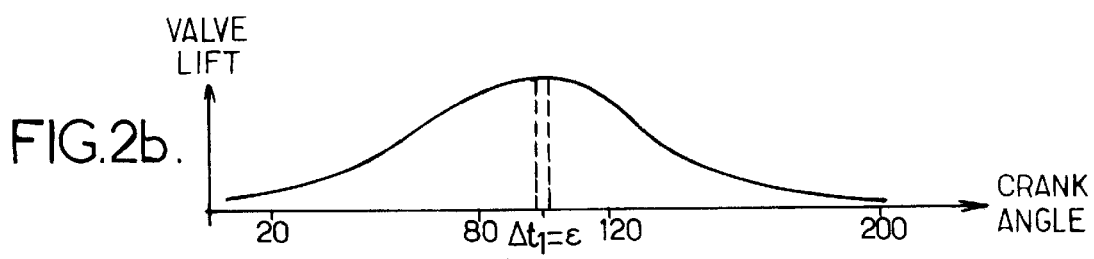

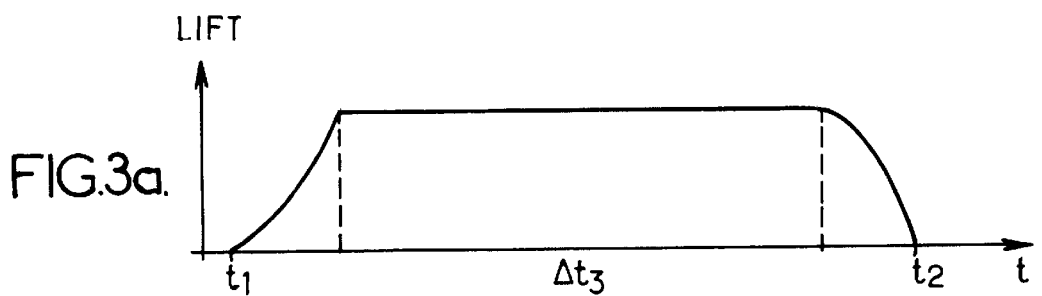
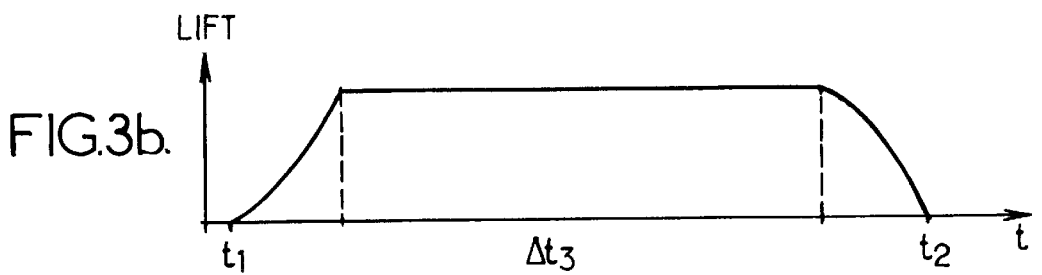
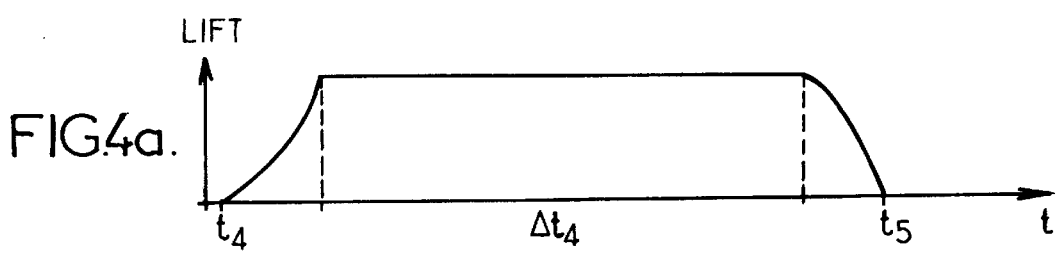
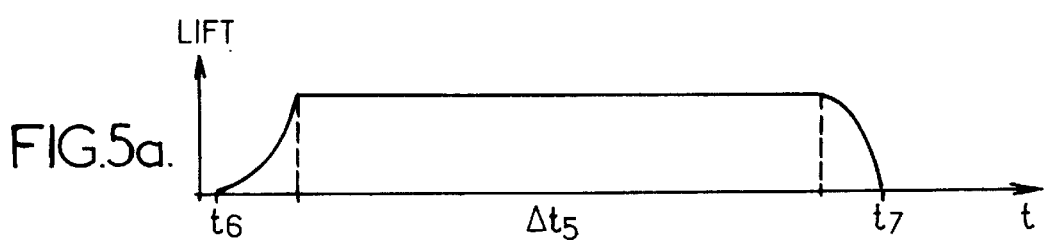
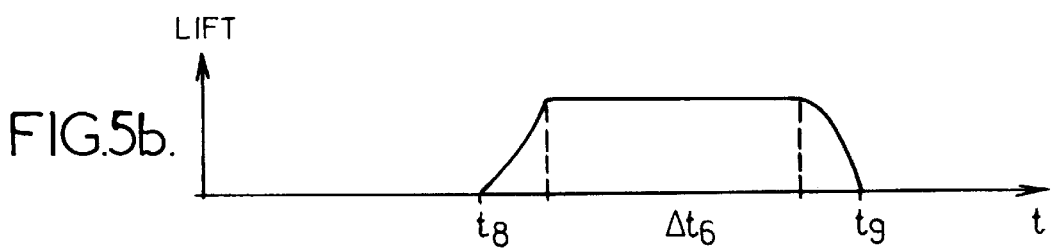

DIRECT-INJECTION INTERNAL COMBUSTION ENGINE WITH CONTROLLED VALVES

The present invention relates to a direct-injection internal combustion engine.

More specifically, the invention relates to engines comprising a camshaft and at least two cylinders; in each cylinder there moves a piston which is associated with at least two inlet valves, each placed in an induction pipe, and with at least one exhaust valve.

In the direct-injection engines customarily encountered, the air/fuel mixture is prepared in such a way as to encourage a drop in fuel consumption and $CO_2$ emissions. To do that, it is known practice to make shaped piston crowns. However, this may not go far enough in the case of engines of small cylinder capacity in that the average path taken by the fuel injected into the cylinders is very short, which may give rise to misfires through lack of evaporation. It is then necessary to stabilize combustion by mixing the air/fuel mixture around.

To do this, it is known practice to create gas velocity fields inside the combustion chamber by using combinations of correctly shaped pistons and mechanical devices situated upstream of the inlet valves. This then yields two types of turbulent velocity field: one of the velocity fields is said to swirl, that is to say that the gases flow at right angles to the axis of the cylinder, while the other of the velocity fields is said to tumble axially in that the gases move parallel to the axis of said cylinder.

However, these mechanical devices allied with the shape of the piston crown, are expensive and do not make it possible, at all engine speeds, to obtain suitable tumbling and swirling velocity fields. What is more, the dead volumes created in the induction pipes in which the mechanical devices are fitted, may have undesirable gas or gas/fuel mixture reflux effects.

To overcome these drawbacks, it has already been proposed, particularly in DE 198 10 466, for the movement of said valves to be independent of the rotation of the camshaft and controlled by a computer which, cylinder by cylinder, controls the opening and closing times of said at least two inlet valves taking account, in particular, of the engine speed. However, the control means needed, according to DE 198 10 466, are complex and costly.

It is an object of the present invention to alleviate these drawbacks using means which are both simpler and more accurate and have higher fluidic efficiency.

To this end, according to the invention, an internal combustion engine of the aforementioned type known from DE 198 10 466 is characterized in that the induction pipes are shaped to give rise to a field of air velocities inside the cylinder which is parallel to the axis of this cylinder and in that the computer controls the movement of said at least two inlet valves to adapt the shape of the air velocity field inside the cylinder to the engine speed, and to create a velocity field chosen from velocity fields parallel to the axis of the cylinder and ones which swirl around the axis of the cylinder.

Thus, by virtue of these arrangements, it is possible at any moment to control the velocity field inside the cylinder through electronic control of the valves.

In some preferred embodiments of the invention, recourse may possibly be had to one and/or other of the following provisions:

the engine is a controlled-ignition engine;

the shape of the crown of the piston is shaped so that as the piston moves, it causes the air velocity field either to be axial tumbling or to swirl;

the computer controls the speed of travel of each inlet valve;

the computer controls the inlet valves to give rise to a swirling velocity field when the engine is operating at light load and an axial tumbling velocity field when the engine is running at heavy load;

the computer controls the inlet valves so as to obtain a continuous transition between one of the velocity fields—axial tumbling and swirling and the other of the velocity fields—swirling and axial tumbling; and the computer controls the opening and closing times of said at least one exhaust valve.

Other features and advantages of the invention will become apparent in the course of the following description of one of its embodiments which is given by way of nonlimiting example with reference to the appended drawings in which:

FIG. 1 is a schematic view of a cylinder of a direct-injection internal combustion engine equipped with two inlet valves and two exhaust valves which are controlled by a computer;

FIGS. 2a and 2b are graphs respectively showing the synchronized movements of the inlet valves according to the prior art;

FIGS. 3a and 3b respectively show the movement of the inlet valves according to the present invention to obtain a field of the tumble type, with induction pipes designed from the outset to produce this type of flow;

FIGS. 4a and 4b respectively show the movement of the inlet valves according to the present invention to obtain a field of the swirl type; and FIGS. 5a and 5b show the movement of the inlet valves according to the invention for switching continuously from a field of the swirl type to a field of the tumble type.

FIG. 1 schematically depicts one of the cylinders 1 of a direct-injection internal combustion engine. This engine is preferably a controlled-ignition engine.

In this cylinder 1 there moves a piston 2 which has a crown 3 facing which there are two inlet valves 4 and 5 and two exhaust valves 6 and 7. Each of the inlet valves 4 and 5 is placed in a respective one of the induction pipes 8 and 9, and the exhaust valves 6, 7 are placed respectively in exhaust ducts 10, 11.

To inject fuel into the cylinder 1, an injector (not depicted) is positioned, in a way known per se, above the crown 3 of the piston 2. This fuel mixes with the air let in by the inlet valves 4 and 5.

The inlet valves 4 and 5 are, for example, electromagnetic valves the opening and closure of which are controlled, according to the present invention, by an engine management computer 15. This computer also controls the injector and the ignition. The valves 4 and 5 are, for example, of the type described in document WO 99/06677.

The piston 2 moves vertically in a reciprocating movement along the axis X—X of the cylinder 1. Its crown 3 is shaped to, among other things, and as far as possible according to its characteristics, give rise to velocity fields of different shapes within the cylinder 1 depending on the engine speed and engine load. The crown 3 of the piston 2 is, for example, the one described in document FR 98 10293.

Typically, in order to mix the air/fuel mixture around, two types of velocity field are created. A first field is known as the axial or tumbling velocity field, in which the gases move parallel to the axis X—X of the cylinder 1, and a second velocity field is known as the rotational or swirl field and in it the gases move at right angles to the axis X—X of the cylinder 1.

In particular, the swirl velocity field is created when the engine load is light and the tumble velocity field is created with the engine load is heavy.

According to the present invention, the shapes of the constituent parts of the engine, and particularly the shapes of the induction pipes 8, 9, are tailored to, by construction, obtain a tumbling velocity field.

The switch from the tumbling velocity field to the swirling field, and vice versa, is obtained, according to the present invention, through electronic control of the inlet valves 4 and 5. These are not connected to an engine crankshaft which means that they can be controlled independently of one another and independently of the engine cycle.

FIGS. 2a and 2b respectively show that the movement of the inlet valves 4, 5 of the prior art is associated with the engine crank angle. The valves therefore have a movement which cannot be controlled independently of the engine cycle and this means that the movement of the valves does not make it possible to modify the velocity field, and in particular the time $\Delta t1$ for which the valve is wide open is very short and invariable.

On the contrary, according to the present invention, FIGS. 3a to 5b show that electronic control of the inlet valves 4, 5 makes the movement of these valves independent of that of the crankshaft and allows the velocity fields to be modified or not, at will, depending on the engine load and the engine speed.

Thus, by causing the inlet valves 4, 5 to open and close substantially simultaneously at, respectively, the instants t1 and t2 as depicted in FIGS. 3a and 3b, the computer 15 makes it possible not to modify the field of the tumble type created by the shape of the constituent parts of the engine.

The computer also makes it possible to control the time $\Delta t3$ for which the inlet valves 4, 5 are open, in order to obtain a maximum tumble effect.

The electronic control also makes it possible to control the rate of opening and the rate of closure of the inlet valves 4, 5 so as to vary the rate of change of the velocity field. The rate of opening may, in particular, differ from the rate of closure.

When the engine load is reduced, it is necessary to stabilize combustion by creating a highly rotational (swirling) velocity field.

According to the present invention, this swirling field is obtained by electronic control of the inlet valves 4, 5. To obtain a maximum swirl effect, the computer opens one (4) of the two inlet valves 4, 5 at an instant t4 and keeps the other inlet valve 5 closed as depicted schematically in FIGS. 4a and 4b. The time $\Delta t4$ for which the valve remains open is also controlled.

In addition, electronic control of the instants of opening and of closure of each of these inlet valves 4, 5 makes it possible to switch continuously from one of these fields to the other.

For example, FIGS. 5a and 5b depict the control of the valves 4, 5 to switch from the swirl field to the tumble field. The opening of the second inlet valve 5 at an instant t8 is subsequent to the opening of the first inlet valve 4 at an instant t6, while these two valves 4, 5 are closed almost simultaneously at closely-spaced instants t7 and t9. The respective times $\Delta t5$ and $\Delta t6$ for which the valves remain open are therefore unequal.

By virtue of the electronic control of the valves 4, 5 it is thus possible to stabilize a highly turbulent (swirling or tumbling) velocity field so as to allow an extremely lean air/fuel mixture to burn and thus reduce the fuel consumption without requiring imprecise mechanical devices to be present in the induction pipes upstream of the inlet valves. In particular, the induction pipes are of a simplified design that encourages the tumble effect (straight induction pipes) and that cause a minimal pressure drop on the stream passing through them.

Furthermore, the exhaust valves 6, 7 are also electronically operated. Thus, aside from the known modes of operation that is to say scavenging (removing gases from the cylinder) and internal EGR (exhaust gas recirculation), it is possible to stabilize the temperature of the combustion chamber to encourage the jet of fuel to evaporate. To do this, the scavenging and internal EGR laws are modified by controlling the opening and closing times of the exhaust valves 6 and 7 in order to recirculate an additional amount of exhaust gas needed to stabilize the mean temperature in the combustion chamber at an appropriate value. This is particularly beneficial at light load because the temperature then is naturally low.

It will be understood that electronic control of the inlet 4, 5 and exhaust 6, 7 valves may also be achieved independently for each cylinder 1 of the engine to best stabilize combustion. During engine development, the valve control parameters which are formulated for each cylinder on the basis of the engine operating point $f(n,q)$ where n is the engine speed and q is the load, are embedded in the maps held in the engine management computer 15.

What is claimed is:

1. A method of control for a direct-injection internal combustion engine comprising a camshaft and at least two cylinders, each cylinder having a piston disposed therein and at least two inlet valves, each inlet valve being placed in an induction pipe shaped to give rise to an air velocity field inside the cylinder which is parallel to the longitudinal axis of the cylinder, an engine speed sensor, and a controller controlling the movement of said valves; the method comprising:

(a) controlling the opening and closing of said at least two inlet valves as a function of engine speed and independent of a rotation of the camshaft;

(b) causing a mean air velocity field inside the cylinder to conform to one chosen from a tumbling velocity field having a vorticity perpendicular to the axis of the cylinder and a swirling velocity field having a vorticity parallel to the longitudinal axis of the cylinder.

2. The method of claim 1, wherein the engine is a controlled-ignition engine.

3. The method of claim 1 or 2 wherein each piston's crown shape is such that, as the piston moves within its cylinder, the air velocity field is a one of an axial tumbling velocity field or a swirling velocity field.

4. The method of claim 1 or 2 wherein the controller controls the speed of travel of each inlet valve.

5. The method of claim 1 or 2 wherein the controller controls said inlet valves to give rise to a swirling velocity field when the engine is operating at light load and an axial tumbling velocity field when the engine is running at heavy load.

6. The method of claim 1 or 2 wherein the controller controls said inlet valves so as to obtain a continuous transition between one of the velocity fields: tumbling and swirling; and the other velocity field: swirling and tumbling.

7. The method of claim 1 or 2, the engine additionally comprising at least one exhaust valve, the method comprising the additional step of: the controller controlling the opening and closing of said at least one exhaust valve.

8. An internal combustion engine comprising:
(a) at least two cylinders;
(b) one piston in each of the at least two cylinders;
(c) at least two inlet valves;
(d) one induction pipe for each inlet valve, one inlet valve being placed in its associated induction pipe, the induction pipe being shaped to give rise to an air velocity field inside the cylinder which is parallel to the longitudinal axis of the cylinder;
(e) an engine speed sensor;
(f) a controller for controlling the movement of said valves as a function of an engine speed, causing a mean air velocity field inside the cylinder to conform to one chosen from a tumbling velocity field having a vorticity perpendicular to the axis of the cylinder and a swirling velocity field having a vorticity parallel to the longitudinal axis of the cylinder.

9. The internal combustion engine of claim 8, additionally comprising ignition control, making the internal combustion engine a controlled-ignition internal combustion engine.

10. The internal combustion engine of claim 8 or 9 additionally comprising a piston crown for each piston shaped such that, as the piston moves within its cylinder, the air velocity field is formed as one of an axial tumbling velocity field or a swirling velocity field.

11. The internal combustion engine of claim 8 or 9 additionally comprising means for controlling the speed of travel of each inlet valve.

12. The internal combustion engine of claim 8 or 9, the controller additionally comprising means to control said inlet valves to give rise to a swirling velocity field when the engine is operating at light load and an axial tumbling velocity field when the engine is running at heavy load.

13. The internal combustion engine of claim 8 or 9, the controller additionally comprising means to control said inlet valves so as to obtain a continuous transition between one of the velocity fields: axial tumbling and swirling; and the other of the velocity fields: swirling and axial tumbling.

14. The internal combustion engine of claim 8 or 9 additionally comprising at least one exhaust valve, wherein the controller controls the opening and closing times of said at least one exhaust valve.

* * * * *